(12) United States Patent
Woodson et al.

(10) Patent No.: US 9,452,895 B2
(45) Date of Patent: Sep. 27, 2016

(54) DENSITY-BASED CARRIAGE CONTROL SYSTEM FOR ACCUMULATOR AND METHOD FOR CONTROLLING AN ACCUMULATOR

(71) Applicant: Sentry Equipment & Erectors, Inc., Forest, VA (US)

(72) Inventors: Timothy A. Woodson, Goode, VA (US); Gary D. Hunt, Ponce Inlet, FL (US); David N. Cooley, Port Orange, FL (US); William M. Connor, Port Orange, FL (US); John P. Choufani, Port Orange, FL (US); Mark T. Brogan, Lake Helen, FL (US); Brian S. Childress, Port Orange, FL (US); Keith A. Knowles, New Smyrna Beach, FL (US); Gert B. Gast, Port Orange, FL (US)

(73) Assignees: SEN-PACK INC., Deland, FL (US); SENTRY EQUIPMENT & ERECTORS, INC., Forest, VA (US)

( * ) Notice: Subject to any disclaimer, the term of this patent is extended or adjusted under 35 U.S.C. 154(b) by 0 days.

(21) Appl. No.: 14/641,001

(22) Filed: Mar. 6, 2015

(65) Prior Publication Data
US 2016/0031656 A1    Feb. 4, 2016

Related U.S. Application Data

(60) Provisional application No. 62/031,256, filed on Jul. 31, 2014.

(51) Int. Cl.
*B65G 1/00* (2006.01)
*B65G 47/51* (2006.01)

(52) U.S. Cl.
CPC ................. *B65G 47/5131* (2013.01)

(58) Field of Classification Search
CPC .......... B65G 1/00; B65G 1/02; B65G 1/023; B65G 47/5109; B65G 47/5113; B65G 47/5118
USPC .............................................. 198/347.1, 594
See application file for complete search history.

(56) References Cited

U.S. PATENT DOCUMENTS

| | | | |
|---|---|---|---|
| 4,313,724 A | 2/1982 | Müller et al. | |
| 6,026,947 A * | 2/2000 | Persson .................. | A22C 25/12 198/364 |
| 6,497,321 B2 * | 12/2002 | Horton ............... | B65G 47/5131 198/594 |
| 7,028,830 B2 * | 4/2006 | Beesley ............. | B65G 47/5131 198/594 |
| 7,032,742 B2 * | 4/2006 | Hartness ........... | B65G 47/5131 198/347.3 |
| 7,926,642 B2 * | 4/2011 | Huttner .............. | B65G 47/5131 198/347.1 |
| 8,573,380 B2 * | 11/2013 | Petrovic ............. | B65G 47/5131 198/347.1 |
| 9,022,200 B2 * | 5/2015 | Baechtel ............ | B65G 47/5131 198/347.1 |
| 2003/0085103 A1 * | 5/2003 | Horton ............... | B65G 47/5131 198/594 |

* cited by examiner

*Primary Examiner* — James R Bidwell
(74) *Attorney, Agent, or Firm* — Nixon & Vanderhye P.C.

(57) ABSTRACT

A method of accumulating products traveling in a conveyor system according to system conditions including: receiving products from an infeed conveyor onto a first conveyor in an accumulator; transferring by a carriage products from the first conveyor to a second conveyor in the accumulator; moving products from the second conveyor to an outfeed conveyor; detecting a density of products moving on the second conveyor; and moving the carriage with along the first and second conveyors if the detected density is above a certain density value.

25 Claims, 5 Drawing Sheets

DENSITY-BASED CARRIAGE CONTROL SYSTEM FOR ACCUMULATOR AND METHOD FOR CONTROLLING AN ACCUMULATOR

CROSS-REFERENCE TO PRIORITY APPLICATION

This application is a non-provisional of and claims benefit of U.S. Provisional Application No. 62/031,256, filed Jul. 31, 2014, which is incorporated by reference in its entirety.

BACKGROUND OF THE INVENTION

The invention relates to the managing of a flow of products on a production or assembly line using an accumulator to compensate for variations in the flow of product on the line. The invention specifically relates to controlling a carriage (also referred to as a car) in an accumulator.

A production or assembly line often uses conveyors to move products, such as bottles, cans and boxed items. The lines include stations each of which perform a task associated with the product, such as filling the product package, labeling the product and arranging the products for bulk transport. Conveyors move the products from one station another. Excessive numbers of products do not to gather at any one station, because each subsequent station processes products at least as fast as, and often at least slightly faster than the preceding station.

If an event causes a station to stop or slow, the oncoming products on the line gather at the station. Difficulties arise due to excessive numbers of products attempting to enter the station. To avoid having products gather excessively at a station, it would be helpful to temporarily extend the upstream conveyor to provide additional area along the conveyor to gather products until the stopped or slowed station resumes normal processing of products.

Temporary extensions of conveyors are provided by accumulators. An accumulator is typically an adjustable spur in a conveyor, referred to as the main line conveyor. Products can be moved onto the accumulator to temporarily divert products from the main line conveyor. The accumulator generally includes a pair of side-by-side conveyors operating in opposite directions. Products move along one of the conveyors and are transferred by a carriage to another conveyor before the products are returned to the main line conveyor.

While the carriage is at the front of the accumulator, products move quickly through the accumulator and are returned to the main line conveyor with only a minimal delay due to the accumulator. While the carriage is at the rear of the accumulator, products travel the full length of both conveyors in the accumulator which causes a substantial delay before products are returned to the main line conveyor. The length of the period that products are on the accumulator, and thus off of the main line conveyor, depends on the position of the carriage.

The carriage is moved along the conveyors of the accumulator to adjust the period during which products are on the accumulator and diverted from the main line conveyor. The further the carriage moves from the front of the accumulator, the longer the products remain on the accumulator conveyors and off the main line conveyor. By moving the carriage, the accumulator provides a means for delaying the movement of products along a main line conveyor, and thus delays the movement of products towards a stopped or slowed station.

Accumulators are disclosed in, for example, U.S. Pat. Nos. 4,313,724; 6,497,321, and 8,573,380. These patents describe various techniques for controlling the movement of the carriage and the conveyors in an accumulator. Conventional accumulators typically move the carriage based on the movement of the conveyors or based on manual controls.

BRIEF SUMMARY OF THE INVENTION

There remains a long felt need for an accumulator that is responsive to the flow of products through a conveyor system and, particularly, to excessive numbers of products gathering on a conveyor or in a particular section of a conveyor. An accumulator has been conceived and is disclosed here that monitors the density of products on a conveyor. If the density increases beyond a threshold, the carriage of the accumulator moves to increase the length available for the products to travel on the accumulator before being returned to a main line, and thus increases the capacity of the conveyor system. By monitoring density of product on a conveyor, the accumulator automatically responds when additional conveyor capacity is needed and before an excessive number of products accumulate on a conveyor.

To aid in reliably and consistently maintaining the flow of goods being sent through a production line, a production line system featuring a density-based carriage control system has been conceived and is disclosed that includes: a pair of conveyor systems oriented and moving in different directions, an infeed section connected to a first conveyor of the pair on which products move from a main line conveyor, an outfeed section connected to a second conveyor of the pair on which products move back to the main line conveyor, at least one density sensor mounted over at least one of the pair of conveyors, and a carriage that moves over the pair of conveyors and is configured to transfer products form the first conveyor to the second conveyor, wherein the carriage is moved based on product density information gathered from the at least one density sensor.

A method of moving products along a main line conveyor has been conceived and is disclosed comprising: arranging a pair of conveyors of an accumulator to be adjacent to each other and oriented to receive products from the main line conveyor and return the products to the main line conveyor, providing at least one density sensor over top of a section of at least one of the conveyors and/or the main line conveyor, providing a carriage to transfer products traveling in a first direction on the first of the pair of conveyors to a second of the pair of conveyors, and moving the carriage based on the information gathered by the at least one density sensor to avoid an excessive density of product on the main line conveyor.

DETAILED DESCRIPTION OF THE INVENTION

The present invention relates to the use of density sensors, e.g., image sensors, capable of measuring density of products being transported on a conveyor system in real time and using data on product density to control an accumulator and particularly the movement of a carriage in an accumulator. The term density may refer to, for example, the number of products within a field of view of a sensor, the intensity of light or the imaged area having more than a light threshold level or a certain color of light reflected from the products in the field of view, and the rate of products passing the sensor or a certain region of a main line conveyor. The sensors may have internal processing capacity such that they directly control the movement of the carriage. Alternatively, the sensors may send signals to an external computer system which controls the carriage. The sensors may employ conventional time-of-flight (TOF) camera technology, three-dimensional TOF camera technology, structured light projection and imaging technology and other types of machine imaging technologies to sense the density of products moving on a conveyor.

The sensors are positioned to monitor at least one or both of the flow of products approaching the carriage body from an upstream conveyor and the flow of products leaving from the carriage body to a downstream conveyor. The sensors provide density data that represents the density of products as they move along the conveyors, e.g., move in real time. The density data is used to control the movement of the carriage. The carriage may move independently of the movement of the individual conveyors bringing products to or directing products away from the carriage.

The system described herein incorporates sensors and a computer system comprising at least a processor or controller and a non-transitory storage apparatus. The storage apparatus is configured to contain at least one executable program with instructions for operating the accumulator system described herein. The processor may be embedded in one or more of the sensors or included in a separate computer or control system.

Figure 1:
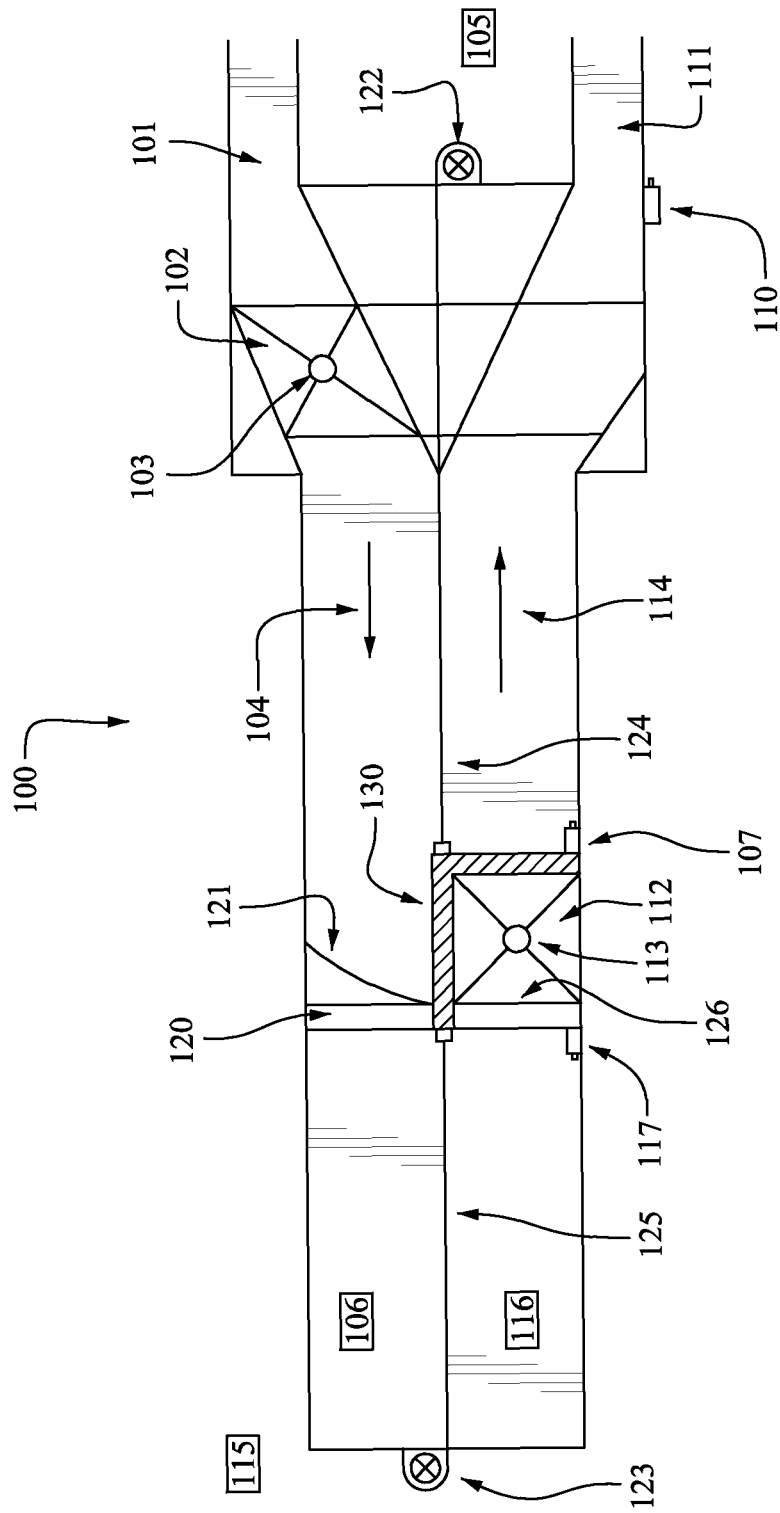
FIG. 1 is a schematic top view of an accumulator forming a spur in a main line conveyor.

FIG. 1 illustrates an accumulator 100 that includes a first density sensor 103 over an infeed measurement section 102 of a first main conveyor system 101. Density information from the first density sensor 103 indicates to a controller 110 the density in real time of incoming products moving in direction 104 on the first main conveyor. Density information from the first density sensor 103 indicating that the density of products passing under the infeed measurement system is below a threshold density causes the carriage body to be moved forward in direction 114 towards a first end 105 of the accumulator. The carriage body 120 moves forward until it (1) reaches a maximum forward point (indicated by first carriage limit sensor 107) or (2) the density sensed in the infeed measurement section reaches a predetermined value, at which point, forward movement of the carriage would cease. Carriage system 120 is moved towards the first end 105 by first end carriage body actuator 122 and first end carriage belt 124.

In response to the first density sensor 103 indicating a density of products above the threshold passing the infeed section 102, the accumulator may optionally consult a second density sensor 113 to measure the density of products successfully transferred from the first conveyor 106 to the second conveyor 116 by the carriage 120 which may have a curved portion 121 to facilitate the transfer of products between the conveyors of the accumulator. Curved portion 121 may be powered and may feature a moving surface to assist with transferring products from first conveyor 106 to second conveyor 116. Curved portion 121 may extend the width of the carriage body, with the portion 126 on the discharge side of the sensor bridge 130 being any acceptable shape, including flat, slanted, or curved.

In the event that first density sensor 103 indicates a density, e.g., number, of products reaching the system via the infeed system 102 at or above the threshold and the second density sensor 113 indicates a density of products being transferred to the second conveyor 116 is above another threshold, the carriage system 120 will move in a direction towards the second end 115 of the accumulation system 100 until either (1) the density measured by one of the density sensors drops below their respective threshold values, or (2) the carriage system 120 reaches a maximum second location (indicated by second carriage limit sensor 117). Carriage system 120 is moved towards the second end 115 by second end carriage body actuator 123 and second end carriage belt 125.

Figure 2:
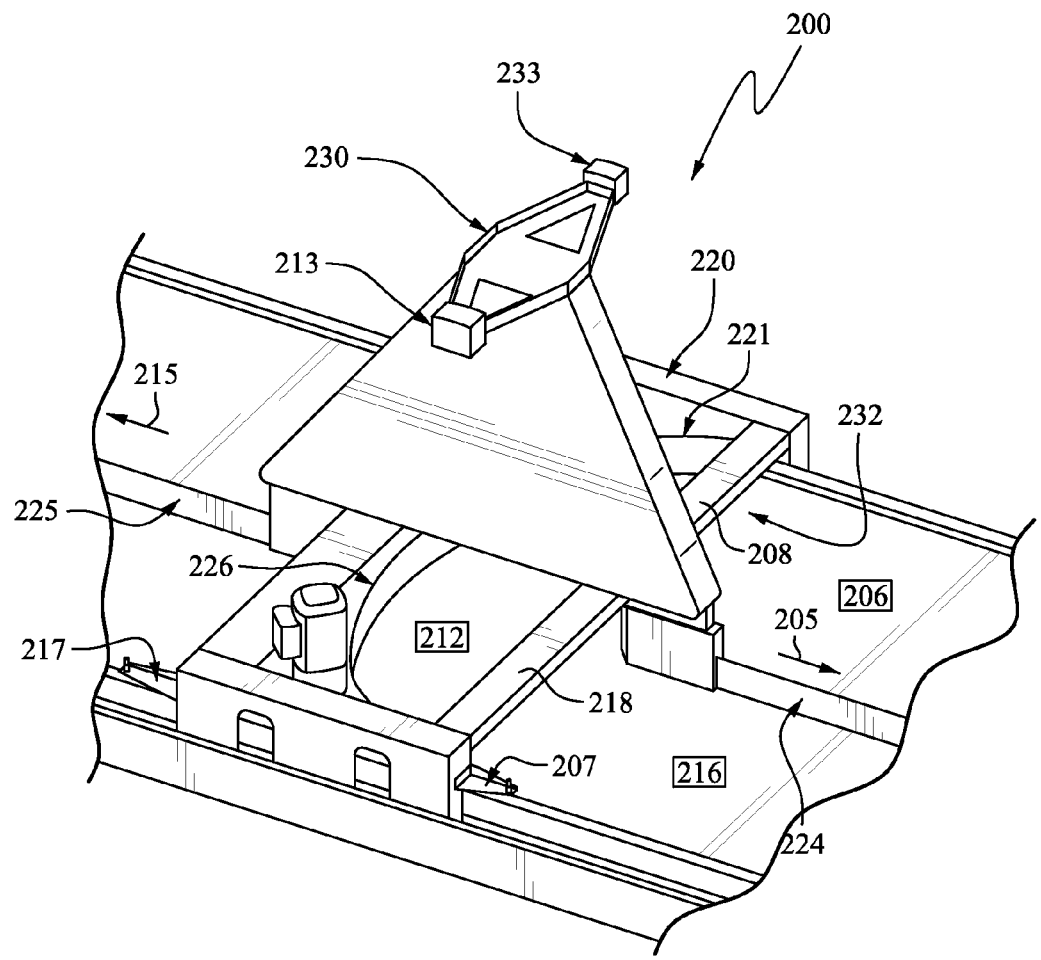
FIG. 2 is a perspective view of the carriage of the accumulator shown in FIG. 1.

FIG. 2 is a perspective view of the carriage body system from the side of the second conveyor system 216. Viewing the carriage body from this perspective, understanding the flow of goods becomes more apparent, as products originating upstream travel along first conveyor system 206 until they pass under first carriage cross bar 208 and come into contact with the curved surface 221 of carriage body 220. As mentioned, curved surface 221 may be powered and supply movement and/or grip to assist with moving products from first conveyor 206 to second conveyor 216. As the products cross to the second conveyor 216, they pass through outfeed density measurement area 212, which is underneath outfeed density sensor 213, and under second carriage cross bar 218 as they travel downstream on second conveyor 216.

Additionally, the carriage body system 200 illustrated in FIG. 2 demonstrates that an optional third density sensor 233 may be utilized as well to refine the carriage body movement using additional data points. Similarly, an optional fourth density sensor (not pictured) may be utilized similar to infeed density sensor on the outfeed side of the system to monitor conditions of the overall system further downstream.

Carriage body 220 can be moved either forward towards a first end 205 or rearward towards a second end 215 using a first end carriage belt 224 and first end carriage body actuator (not shown) or a second end carriage belt 225 and a second end carriage body actuator (not shown). The actuators serve to pull their respective carriage belt towards their respective end while maintaining a taut belt capable of preventing products from prematurely crossing from first conveyor 206 to second conveyor 216. Actuation of either actuator is controlled by a controller (not shown) which interprets various data, and density data in particular.

One embodiment includes the following process, executed, for example, by controller 210. Initially, the system checks to ensure there are products arriving to the system through the infeed section. Then, the system checks the density, e.g., rate or amount, of products being brought into the carriage system by the first conveyor system. A first sensor measures the density of products being delivered, preferably by measuring the density of products on the conveyor system, and communicates that information to a controller. If the controller determines that the density of products is less than a predetermined value, i.e., the "prime"

value, the system checks the location of the carriage body. The system will consult the first carriage limit sensor. If the carriage body is not already at its maximum forward position, the system will move the carriage body forward until either 1) the carriage body is moved to its maximum forward position, or 2) the first sensor indicates that the density of products in the first sensor's observation zone is greater than or equal to the prime value.

If the system indicates that the density of products passing through the first sensor's observation zone is equal to or greater than the prime value, the system then moves on and again checks the location of the carriage body. In this step, the system checks the second carriage limit sensor. If the carriage body is not already at its maximum rearward position, the system may then check a second sensor to measure the density of products passing through the discharge side of the carriage body, corresponding to the section of the second conveyor system under the second sensor. If the density of products in the second sensor area, i.e., density, is less than a predetermined value, the carriage body will remain in its current position. However, if the second sensor determines that the density of products passing through the second sensor observation area is greater than or equal to the predetermined value, the system will move the carriage body rearward until either 1) the carriage body is moved to its maximum rearward position, or 2) the second sensor indicates that the density of products in the first sensor's observation zone is less than the prime value, in which case the carriage body will stop moving rearward.

The carriage may be moved at a constant speed. The control system determines whether the carriage is to be moved and may or may not adjust its speed. Similarly, the carriage may be moved independently of the first and second conveyor systems. There may be situations where one or both of the conveyors are stopped and the carriage moves. Further, the conveyors may be both moving at the same speed (but different or opposite directions) while the carriage is moving.

This is a continuous process, with the controller accepting input from both sets of sensors and continuously processing data from at least the first and second sensors described herein. The controller may optionally additionally receive information from at least a third sensor positioned, for example, over the intake side of the carriage, and a fourth sensor positioned, for example, over the outfeed section of the second conveyor system. The controller may optionally additionally receive information from upstream or downstream sensors that will allow the accumulator system featuring a density-based carriage control system to anticipate and compensate for situations encountered in other parts of the system, both locally and globally (within the overall production line) which would affect the accumulator system described herein.

In an alternative embodiment, an analogous system may utilize at least one sensor, which may be reliant on density measurements, to control the movement of the conveyor systems in addition to, or instead of, the movement of the carriage body. In such an embodiment, similar concepts related to flow of products into an infeed area would result in a determination of, i.e., density, and a control system would then determine whether to activate, and at what speed, at least one, and preferably two, conveyors. Such an analogous system may also utilize additional sensors, including sensors on both the infeed and/or the outfeed/discharge side of the system. Likewise, such a system may also incorporate sensors farther upstream or downstream from a specific accumulator unit, the sensors reporting data such as flow density in other parts of the overall system.

Figure 3:
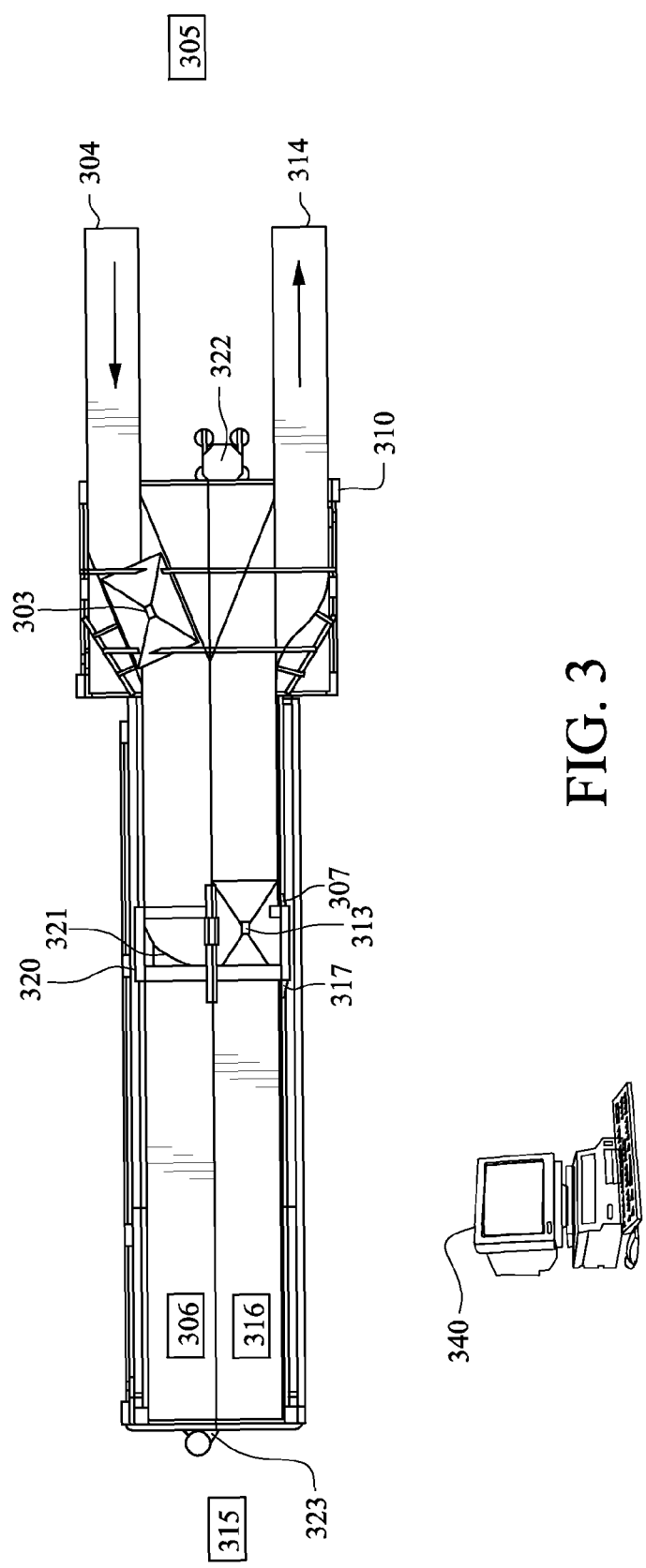
FIG. 3 is a schematic top view of another embodiment of an accumulator connected to a main line conveyor.

FIG. 3 is a perspective view of the accumulator system. In the perspective view, products flow into the accumulator system in direction 304 and onto infeed accumulation bed 306. As the products travel towards the load end 315, the products encounter carriage body 320 as they come into contact with curve 321, which may be powered. Products are then directed to discharge accumulation bed 316 by a force or combination of forces resulting from the movement of infeed accumulation bed 306 and/or curve 321, which may be powered and/or outfitted with a surface capable of grasping or directing flow of products. The products then are directed in product flow direction 314 for discharge from the accumulator system 300. As the system accepts products coming from upstream, carriage body 320 may be moved between load end 315 and unload end 305 by load end carriage drive 323 and unload end carriage drive 322, respectively. Carriage body is moved in response to information measured by at least product level sensor 303 during the infeed portion of the accumulation system and product level sensor 313. Information from at least sensor 303 and sensor 313 are sent to computer system 340, where instructions are executed to run a program to check the location of the carriage body along the length of the accumulator system using at least first carriage travel limit sensor 307 and second carriage travel limit sensor 317.

Figure 4:
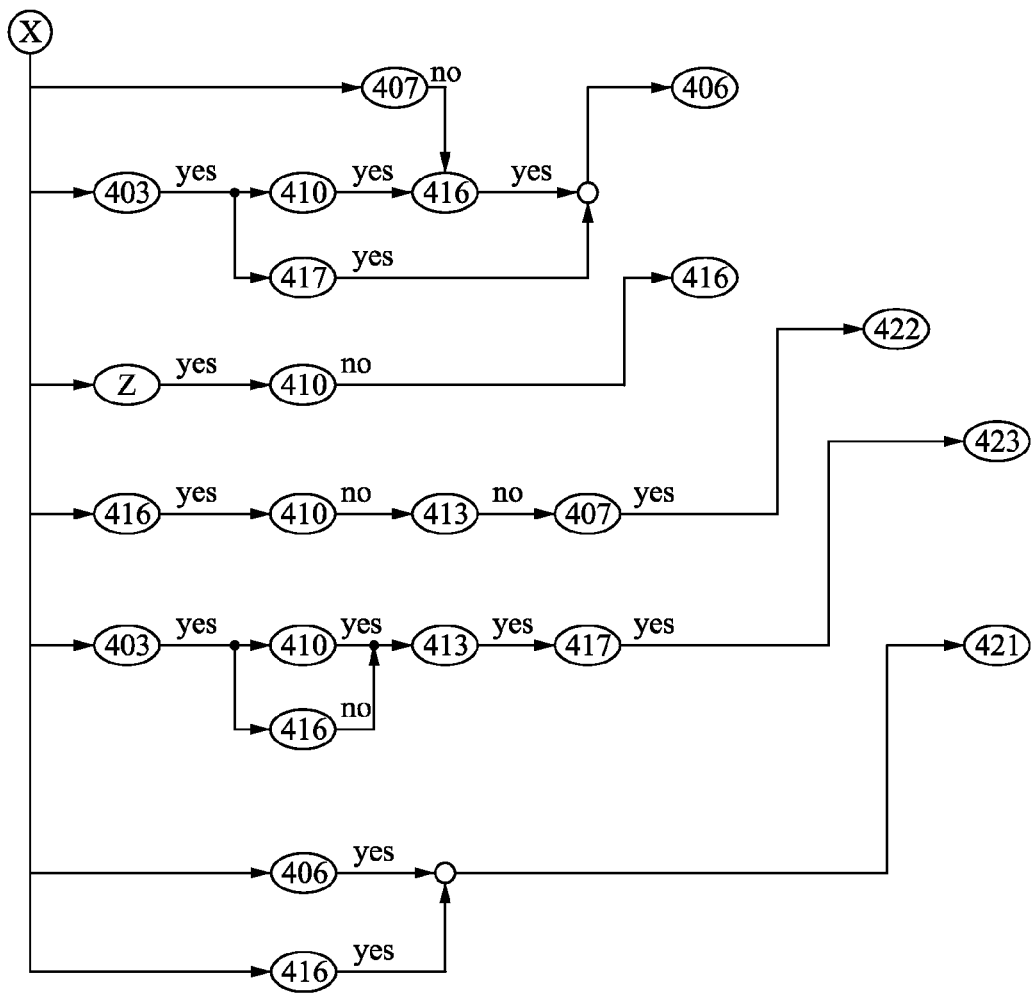
FIG. 4 is a schematic showing the logic process followed by the accumulator to determine the movement of the carriage.

FIG. 4 is a logic diagram further describing an example of the instructions stored in a non-transitory memory and provided to the computer system 340 regulating the accumulation system depicted in FIG. 3. After checking that the system is powered on and no faults are indicated from a variety of sensors (step X), which may be located locally or globally (within the overall production line system), the system consults sensors locally to decide how to operate the accumulator system based on observed conditions.

In step 407, the carriage travel limit sensor is checked to determine whether the carriage body is able to move farther forward (in the direction of the unload end of the system). If the limit sensor indicates that the carriage body is at its maximum forward position (and cannot be moved farther forward), the system determines, in step 416, if the second conveyor (discharge conveyor) of the accumulator is moving and, if so, may activate the first conveyor (infeed conveyor) in step 406.

In step 403, the infeed density sensor 303 is checked to confirm that products are passing into the accumulator above a certain density level and, if so, the density is checked (step 410) for products moving on the second conveyor (outfeed) and whether (step 417) the carriage is at the rear of the accumulator. If the carriage is at the rear of the accumulator, the first conveyor (infeed) may move products towards the carriage in step 406. Similarly, if the density of products is greater than a certain level on the second conveyor and the second conveyor is moving (step 416), the first conveyor may move products towards the carriage.

In step 418, a check is made to confirm that the main conveyor system downstream of the accumulator is running correctly. If true, even if the density is not above a threshold of product on the second conveyor of the accumulator (step 410), the second conveyor of the accumulator may be operated in step 416.

Before the carriage is returned to the front of the accumulator (step 422), the system checks if the second conveyor is moving in step 416, confirms that the density of products on the second conveyor is below a threshold step 410, checks that the density is below a threshold level (step 413)

of products moving off the accumulator and that the carriage is not already at the front of the accumulator in step 407.

Before moving the carriage towards the rear of the accumulator (step 423), the system confirms that the density of products entering the accumulator is above a threshold (step 403), determines whether the second conveyor has a density of products above a threshold (step 410) or second conveyor is not moving (step 416), confirms that products are moving from the accumulator to the downstream main line conveyor (step 413) and that the carriage is not already at the rear in step 417.

While moving the carriage towards the rear of the accumulator (step 406) or towards the front (step 416), the speed of the carriage may be constant or varied (step 421) to gradually increase and slow to and from the constant speed. The speed of the carriage may vary, such as in a sinusoidal manner, about a constant level to assist in the movement of products between the conveyors of the accumulator.

Figure 5B:
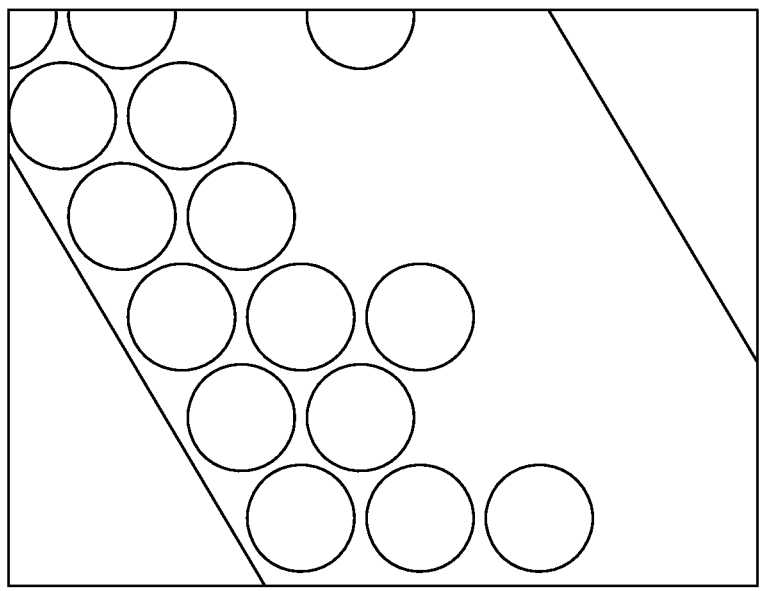
FIG. 5(b) illustrates a conveyor with a lower density of products.
Figure 5A:
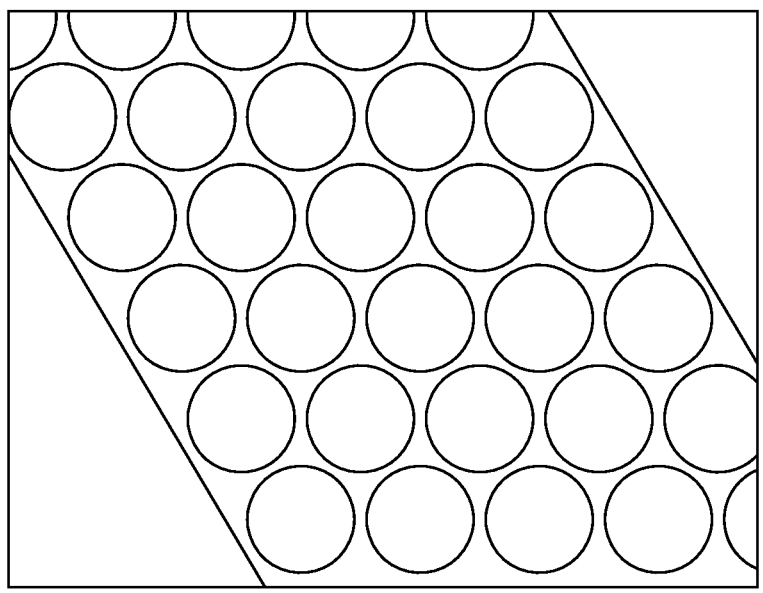
FIG. 5(a) illustrates a conveyor with a high density of products.

FIG. 5(*a*) is an example of a flow of products demonstrating a high number of products passing through the observation area, with such a flow density likely being greater than or equal to a predetermined, or prime, value. FIG. 5(*b*), on the other hand, is an example of a flow of products demonstrating a lower number of products passing through the observation area, with such a flow density likely being less than a predetermined value.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An accumulator system for use in packaging and assembly systems, comprising:
   a first conveyor configured to move products in a first direction;
   a second conveyor configured move products in a second direction;
   a carriage configured to transfer products from the first conveyor to the second conveyor;
   a product density monitor comprising at least one sensor positioned to view products being conveyed towards, through, or away from the accumulator system, wherein the at least one sensor is configured to sense an intensity or color of light passing through or reflected by the products and in a field of view of the at least one sensor, and the product density monitor generates density data based on the sensed intensity or color of the light wherein the density data indicates a density of the products in the field of view at a point in time, and
   a carriage actuation system, wherein:
   the first conveyor comprises a product infeed section at a first end of the accumulator system;
   the second conveyor system comprises a product outfeed section at the first end of the accumulator system;
   the carriage actuation system is configured to move the carriage system between a first carriage position proximate the first end and a second carriage position proximate a second end of the accumulator system, and
   the carriage actuation system moves the carriage in response to the product density system and based on the density data.

2. The accumulator system according to claim 1, wherein the first conveyor and the second conveyor are side-by-side and move in opposite directions.

3. The accumulator system according to claim 1, wherein the product density monitor includes in a computer processing instructions stored on a non-transitory storage medium to determine when to move the carriage system based on data provided by the at least one sensor.

4. The accumulator system according to claim 3, wherein the at least one sensor includes an upstream sensor sensing a density of product moving towards the accumulator system and a second sensor sensing a density of product moving downstream of the carriage.

5. The accumulator system according to claim 1, wherein the at least one sensor determines the density of the product and issues a command to the carriage actuation system to move the carriage.

6. The accumulator system according to claim 1, wherein the carriage actuation system moves the carriage at a constant speed.

7. The accumulator system according to claim 1, wherein the carriage system comprises a carriage body with a first product barrier located where the carriage body overlaps the first conveyor system and a second product barrier located where the carriage body overlaps the second conveyor system.

8. The accumulator system of claim 7, wherein the second product barrier is flat, slanted or curved.

9. The accumulator system according to claim 7, wherein the first product barrier is curved.

10. An accumulator system for use in packaging and assembly systems, comprising:
    a first conveyor configured to move products in a first direction;
    a second conveyor configured move products in a second direction;
    a carriage configured to transfer products from the first conveyor to the second conveyor;
    a product density monitor comprising at least one sensor positioned to view products being conveyed towards, through, or away from the accumulator system, an
    a carriage actuation system, wherein:
    the first conveyor comprises a product infeed section at a first end of the accumulator system;
    the second conveyor system comprises a product outfeed section at the first end of the accumulator system;
    the carriage actuation system is configured to move the carriage system between a first carriage position proximate the first end and a second carriage position proximate a second end of the accumulator system, and
    the carriage actuation system moves the carriage in response to the product density system and base,
    wherein the carriage actuation system further comprises at least a first carriage belt and a first carriage drive and a second carriage belt and a second carriage drive, further wherein the first carriage drive acts to extend or retract the first carriage belt and the second carriage drive acts to extend or retract the second carriage belt.

11. An accumulator system for use in packaging and assembly systems, comprising:
    a first conveyor configured to move products in a first direction;
    a second conveyor configured move products in a second direction;
    a carriage configured to transfer products from the first conveyor to the second conveyor;
    a product density monitor comprising at least one sensor positioned to view products being conveyed towards, through, or away from the accumulator system, and
    a carriage actuation system, wherein:

the first conveyor comprises a product infeed section at a first end of the accumulator system;

the second conveyor system comprises a product outfeed section at the first end of the accumulator system;

the carriage actuation system is configured to move the carriage system between a first carriage position proximate the first end and a second carriage position proximate a second end of the accumulator system, and the carriage actuation system moves the carriage in response to the product density system and based on a density of product moving towards or through the accumulator system, wherein the carriage system comprises a carriage body with a first product barrier located where the carriage body overlaps the first conveyor system and a second product barrier located where the carriage body overlaps the second conveyor system, wherein the second product barrier is flat, slanted or curved, and the first product barrier is curved, and wherein the first product barrier comprises a surface configured to grasp or grip products as they come into contact with the surface.

12. An adjustable carriage apparatus for use in an accumulator, comprising:

a carriage body configured to transfer products traveling in a first direction on a first path to a second path configured to travel in a second direction;

at least one sensor configured to sense a density of the products moving towards or through the accumulator, wherein, to sense the density, the at least one sensor is configured to sense an intensity or color of light passing through or reflected by the products in a field of view of the at least one sensor;

a carriage body actuator, wherein:

the carriage body actuator is configured to move the carriage body between a first position proximate a front of the accumulator and a second position proximate a back of the accumulator; and the carriage body actuator is configured to move the carriage body along the path based on a density of product moving towards or through the accumulator, and wherein the density is determined based on the sensed intensity or color of the light at a point in time.

13. The adjustable carriage apparatus according to claim 12, wherein the at least one sensor is an image sensor having a field of view, and the image sensor detects a density of products moving through the field of view.

14. The adjustable carriage apparatus according to claim 13, wherein the carriage body actuator moves the carriage body in response to the at least one sensor detecting a density of products moving downstream of the carriage body, wherein the detected density is above a threshold density value.

15. The adjustable carriage apparatus according to claim 14, wherein the carriage body comprises a first section over the first path and a second section over the second path.

16. The adjustable carriage apparatus according to claim 15, wherein the first section of the carriage body comprises a curved portion which directs products from the first path to the second path.

17. The adjustable carriage apparatus according to claim 15, wherein the second section of the carriage body is flat, slanted, or curved.

18. An adjustable carriage apparatus for use in an accumulator, comprising:

a carriage body configured to transfer products traveling in a first direction on a first path to a second path configured to travel in a second direction;

at least one sensor configured to sense a density of products moving towards or through the accumulator;

a carriage body actuator, wherein:

the carriage body actuator is configured to move the carriage body between a first position proximate a front of the accumulator and a second position proximate a back of the accumulator; and the carriage body actuator is configured to move the carriage body along the path based on a density of product moving towards or through the accumulator, and wherein the density is determined based on information captured by the at least one sensor, wherein the at least one sensor is an image sensor having a field of view, and the image sensor detects a density of products moving through the field of view, wherein the carriage body actuator moves the carriage body in response to the at least one sensor detecting a density of products moving downstream of the carriage body, wherein the detected density is above a threshold density value, wherein the carriage body comprises a first section over the first path and a second section over the second path, wherein the first section of the carriage body comprises a curved portion which directs products from the first path to the second path, and wherein the curved portion is powered.

19. The adjustable carriage apparatus according to claim 18, wherein the curved portion comprises a surface configured to grasp or grip products as they come into contact with the surface.

20. A method of accumulating products traveling in a conveyor system according to system conditions comprising:

receiving products from an infeed conveyor onto a first conveyor in an accumulator;

transferring by a carriage the products from the first conveyor to a second conveyor in the accumulator;

moving the products from the second conveyor to an outfeed conveyor;

detecting a density of the products moving on the second conveyor, wherein the density is detected based on an intensity or color of light captured by a sensor at a point in time wherein the sensor monitors products on one or more of the infeed conveyor, first and second conveyors and outfeed conveyor, and moving the carriage along the first and second conveyors in response to the detected density being above a certain density value.

21. The method according to claim 20, further comprising detecting a second density of products moving from the infeed conveyor onto the first conveyor, and moving the carriage in a direction of movement of the second conveyor if the detected second density is above a second certain value.

22. The method according to claim 20, wherein the movement of the carriage is at a constant speed.

23. The method according to claim 20, wherein the movement of the carriage is in a direction of movement of the first conveyor if the detected density is above the certain value.

24. The method according to claim 20, wherein the detection of density of products moving on the second conveyor is performed as the products move downstream of the carriage.

25. The method according to claim 20, wherein the first and second conveyors move independently of the carriage.

* * * * *